United States Patent [19]

Gabriel

[11] Patent Number: 4,536,024
[45] Date of Patent: Aug. 20, 1985

[54] TECHNIQUES FOR SAFELY UNLOADING CARGO

[76] Inventor: Edwin Z. Gabriel, 318-B South St., Eatontown, N.J. 07724

[21] Appl. No.: 162,387

[22] Filed: Jun. 23, 1980

[51] Int. Cl.³ ............................................. B64D 1/04
[52] U.S. Cl. ................................................. 294/82.24
[58] Field of Search ............... 294/83 R, 65.5, 83 A, 294/83 AB, 83 AE, 84, 86 R, 86 A, 88, 90, 106, 110 R, 113, ; 24/201 A, 230; 241/133 R, 151 B

[56] References Cited

U.S. PATENT DOCUMENTS

| | | | |
|---|---|---|---|
| 1,900,194 | 3/1933 | Niemi | 294/83 R |
| 3,304,111 | 2/1966 | Kauh et al. | 294/65.5 |
| 3,416,832 | 12/1968 | Rice | 294/83 R |
| 3,945,295 | 3/1976 | Robison | 294/83 R |

*Primary Examiner*—James B. Marbert

[57] ABSTRACT

A detachment and coupling device comprising an upper scissor-like part and a lower doughnut-shaped ring part, in which blades of the scissor-like part extend through the ring part and are locked in place. The locking mechanism is either of the magnetic type or of the solenoid type.

16 Claims, 55 Drawing Figures

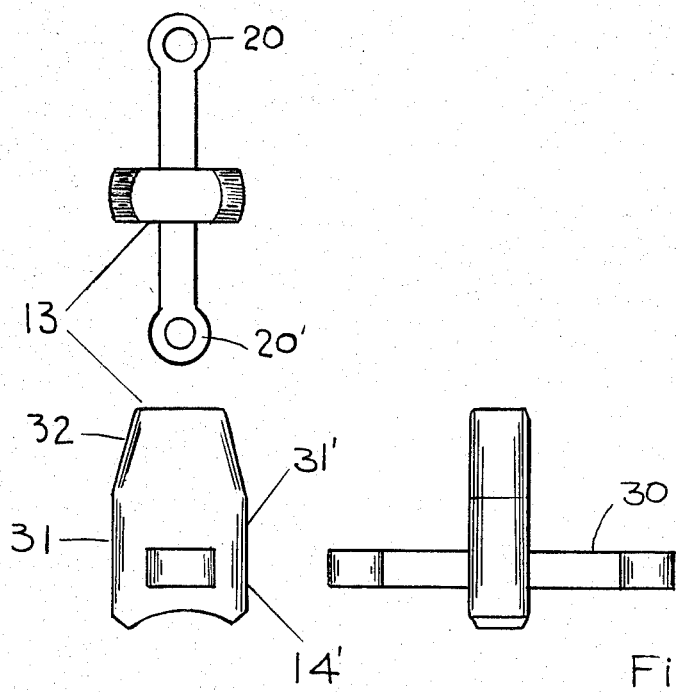
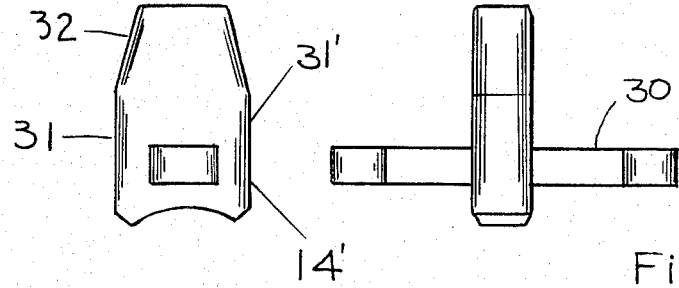
Fig. 13
Fig. 12
Fig. 14
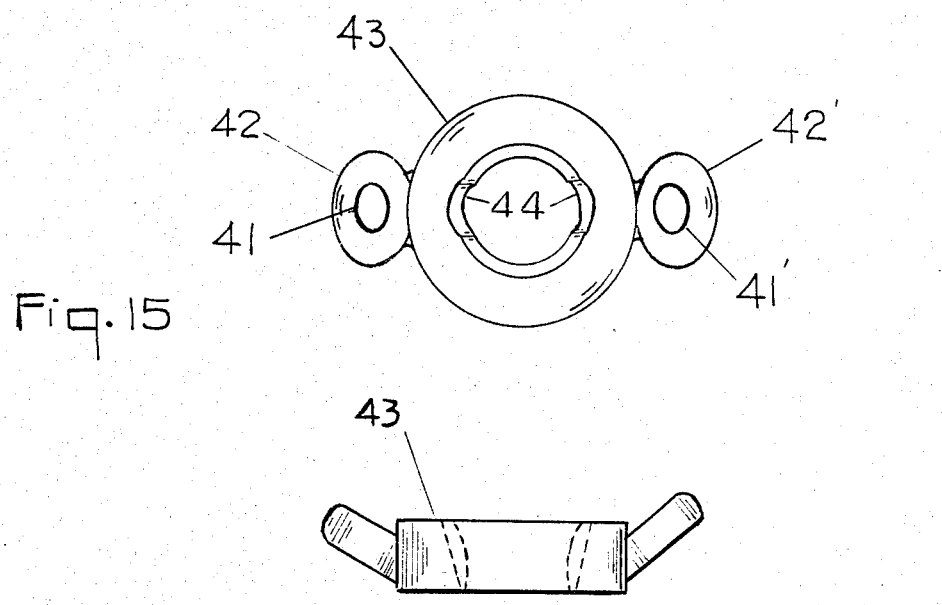
Fig. 15
Fig. 16

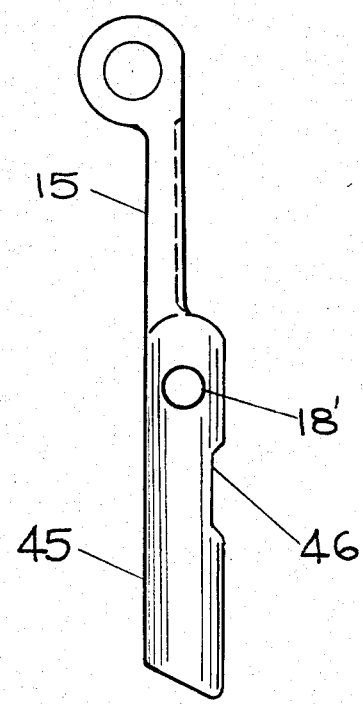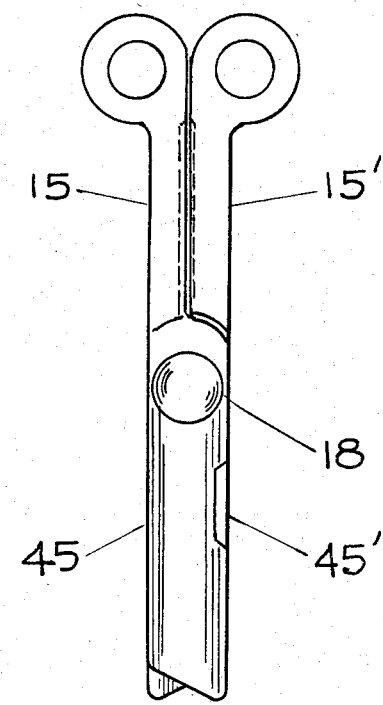
Fig. 21A  Fig. 20A
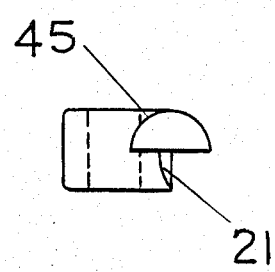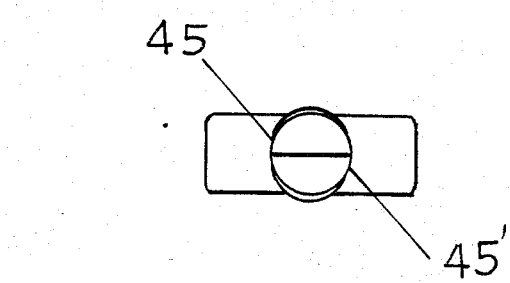
Fig. 21B  Fig. 20B

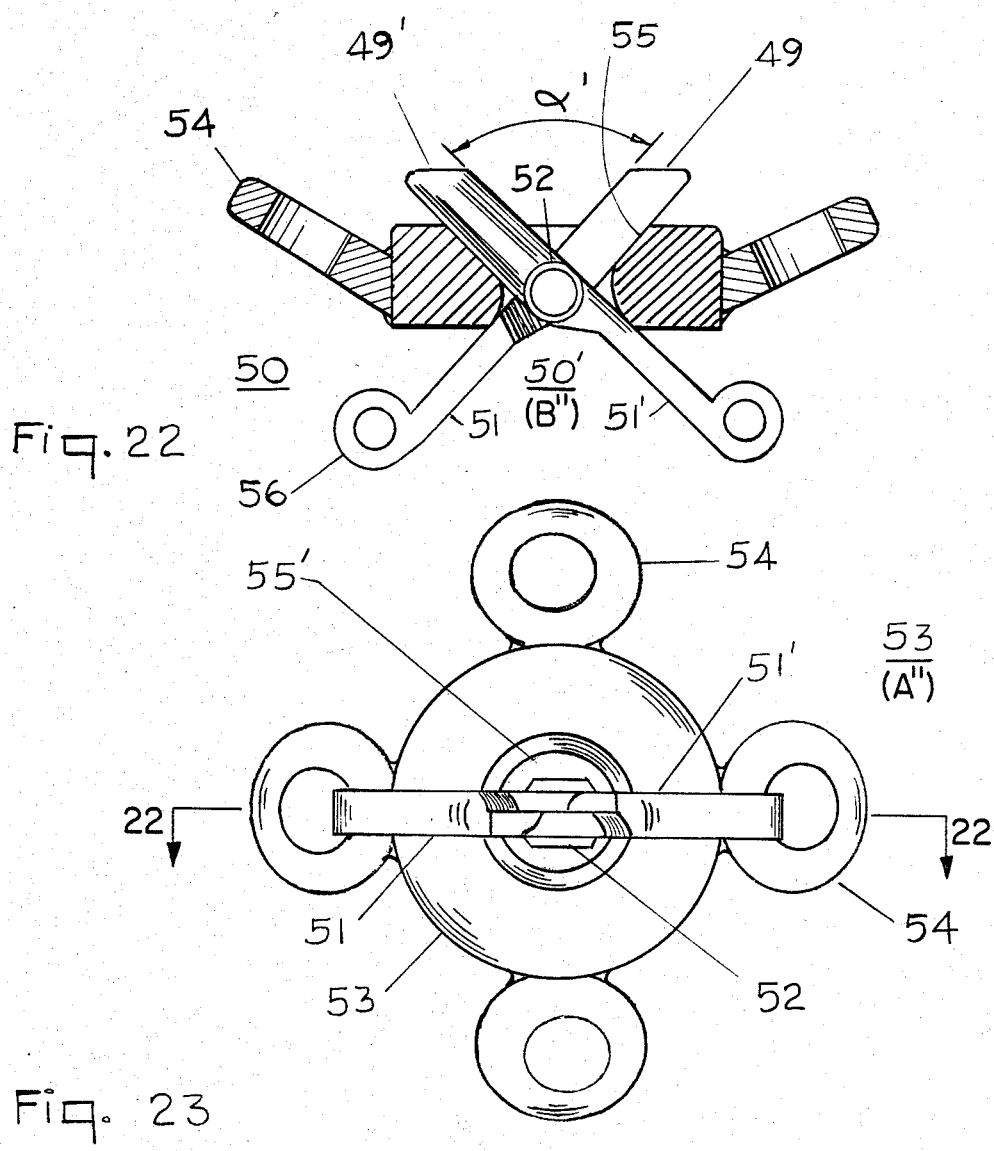

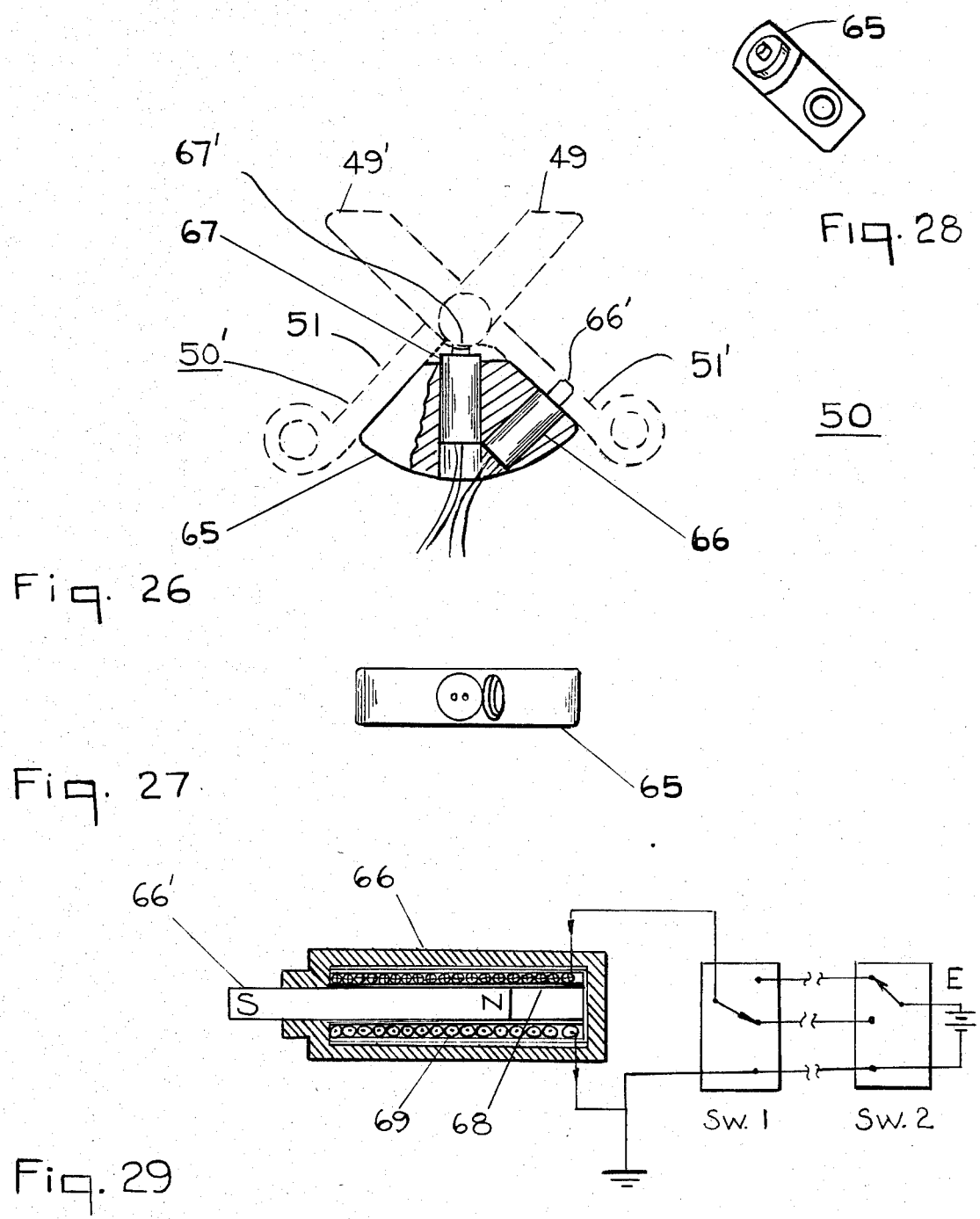

TECHNIQUES FOR SAFELY UNLOADING CARGO

BACKGROUND

In the past, bulky, cumbersome hooks and couplings have been used to suspend cargo from helicopters, derricks, cranes. Besides, detaching cargo from hoist cables has required personnel to be present at the loading platform area. Perhaps this is one reason why single point operation has been preferred over multi-point operation, particularly for externally—slung helicopter loads. Time is consumed in detaching cargo from the hoist and the more hooks to disengage, the more time required to remove the cargo. If the load's removal can be done automatically upon its contact with the platform and with a minimum of time and effort, then two-point operation would be preferred. With two-point suspension, there would be less swaying and twisting of the load, particularly under wind—gusty conditions. The helicopter pilot would be able to control his aircraft better, as a swaying load would increase the pilot's workload, if not make impossible a precise unloading operation.

Suspended cargo from helicopters would become more popular, using the devices described here. Also, the need for skilled personnel at the loading area to remove cargo would be unnecessary. Just any laborer could remove cargo, should ground personnel be required. For example, there are no signal wires to detach in most of the techniques described.

The Boeing heavy lift helicopter (Vol.II S 301-10000-2 of 31 Oct. 1973, contract DAA J01-71-C-0840(P40)), states that hook-up time to a prepared load is to be performed in no more than two (2) minutes. A cable, separate from the hoist tension member and attached directly to each coupling, deployed from a separately powered cable reel, mounted adjacent to the main hoists, is recommended by Boeing helicopters. The cable carries conductors for mechanizing a remote mechanical hook release system, and runs from the coupling at the load to the crew station within the aircraft. Using the release mechanism suggested here, one could omit the above remote electrically—actuated hook release system. An electrically actuated hook wound complicate the release system, and sending electrical signals through long conductors to release hooks may not be an altogether reliable operation.

Besides, Boeing recommends a cable assembly with a protective outer braid metal sheath, for protecting and supporting the conductors and providing a tension load path so as to be used as a back-up for a mechanical—pull coupling—release. Such a cable would add substantial weight to the aircraft, while a lightweight cord to remove a magnet, as described here, would contribute very little weight. Since no electrical signals are required for remotely releasing a load, there would be no problems associated with the possibility of the signal path becoming open-circuited, in the techniques described here.

The need, particularly by the U.S. Navy, for a quick load release system is apparent when one realizes that the military must load and unload ships quickly, if it is going to win battles and save personnel and equipment under adverse conditions.

In offshore ship-loading,, the problem of suspended, swinging containerized loads exists under wind gust conditions, making the loading operation hazardous to ship personnel. A previous U.S. Pat. No. 4,054,103, shows how this problem can be reduced by means of inflated paddings.

In one or more of the techniques described here, ship personnel at the loading area may be eliminated, thus reducing the hazardous conditions described in U.S. Navy reports, such as AD-A030 365/1st August 1976, by L. Bonde and David Dillon.

To satisfy the military, the last two techniques described include solenoids and a wedge-shaped member, which assure that the scissorlike part maintain engagement with a doughnut-shaped part until the solenoids are actuated remotely. With the wedge-shaped part removed, the scissorlike part collapses, allowing it to slip through the central hole of the doughnut-shaped part.

SUMMARY OF THE INVENTION

The present invention is directed to suspension devices which can be decoupled quickly with a minimum of personnel. A heavy load swaying under the impact of wind gusts can be dangerous to ground personnel. Thus it is desirable that loads be disengaged from hoist cables without ground personnel in the immediate loading area. In the case of suspended helicopter loads, ground personnel also would be subjected to rotor downwash, something that should be avoided.

Many of the load decoupling devices described do not require any external power or electrical signals. Any dependance on such external sources could be a reliability handicap and problem. The effort has been toward "spartan" simplicity in the design of all the techniques described.

If the suspended cargo is unloaded onto a ship at sea, then it is assumed that aircraft stabilization equipment, ship motion stabilization equipment and pilot effort would assist in the cargo unloading process. They would aid in keeping both the aircraft and the ship steady while the cargo is being lowered onto the loading platform. In situations where the loading platform is stationary, the unloading problem would be less acute. It also is desirable to provide a cushion, such as an inflated pad, described in U.S. Pat. No. 4,054,103, entitled, "Techniques for Safely Unloading Externally-Slung Helipcopter Loads", to absorb the load's impact under accidental unloading conditions. A description of this mattress-type cushion need not be repeated here.

Some techniques described here for decoupling the load enable the load to be either automatically detached upon making ground contact or detached by remotely removing a permanent magnet. One preferred detachment device comprises an upper and a lower part. The upper part is a scissor-like device with holed handles and scissor-like blades which extend into a large hole in the lower doughnut-shaped part. The latter part has large eyelets fastened rigidly and externally to itself; and these eyelets are for attachment to the load by means of properly-sized cables. A magnet is placed between the handles of the upper part to keep the scissor-like blades apart. It may be removed, after the load has made contact with the platform and cable tension is relieved, by the pilot or by a helicopter crew member pulling on a cord attached to the magnet. Should the cord break, ground or shipboard personnel could pry off the magnets by means of, say, a heavy screw driver. Then the devices would automatically decouple.

BRIEF DESCRIPTION OF THE DRAWINGS

For the purpose of illustrating the invention, there are shown in the drawings form thereof which are presently preferred. It is understood, however, that this invention is not necessarily limited to the precise arrangement, instrumentalities and field of utility as therein demonstrated.

FIG. 12 is a front view of the magnet, shown in FIG. 6.

FIG. 13 is its bottom view.

FIG. 14 is its edge view.

FIG. 15 shows an alternate design for cylindrical part shown in FIG. 9,—a doughnut-shaped ring. The scissorlike blades of the sling detachment device pass through the center hole of the ring shown. The large eyelets are for cable attachment.

FIG. 16 is the side view of FIG. 15.

FIG. 20A is an assembly view of the scissorlike part with the blades closed, to show the indentation, one at each side's exterior blade.

FIG. 20B shows the assembly's bottom view.

FIG. 21A is a detailed front view of a single blade of the scissorlike upper part of FIG. 17.

FIG. 21B is its bottom view.

FIG. 22 shows an assembly view of another modified load detachment device without a magnet. Note that the angle between the scissorlike blades is greater than in FIG. 17 and also the doughnut-shaped ring's position is more centrally located.

FIG. 23 shows the bottom view of assembly of FIG. 22.

FIG. 26 is a front view of a wedge-shaped member with two solenoids embedded within, one a pusher and one a pull type.

FIG. 27 is a bottom view of the above member.

FIG. 28 is its side view.

FIG. 29 is a circuit diagram of one solenoid and two switches, each capable of activating the solenoid. Switch 1 is at the load location while switch 2 is at the aircraft or crane house location.

FIG. 32 is an end view of one rotary solenoid, while

DESCRIPTION OF THE PREFERRED EMBODIMENTS

Figure 1:
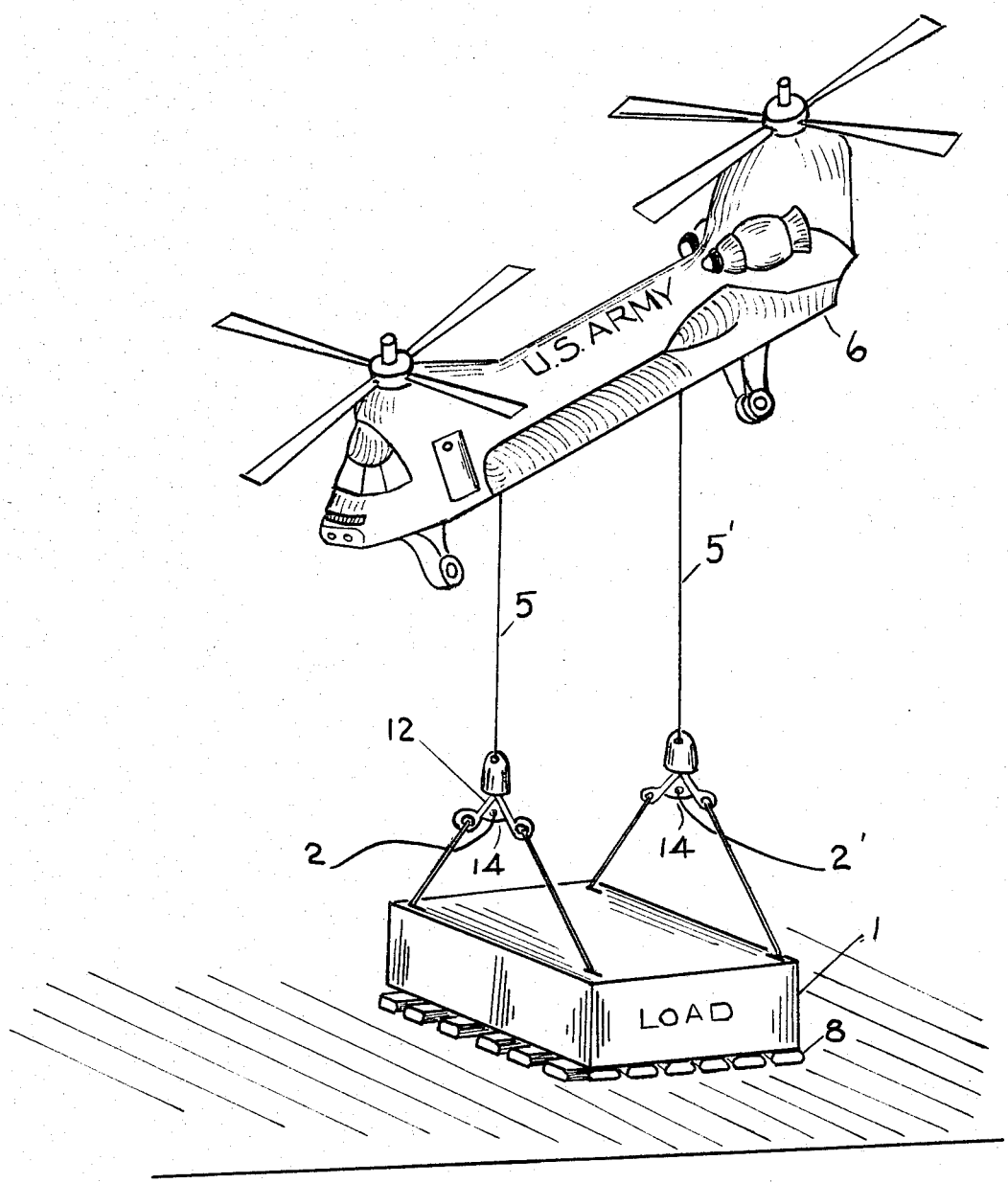
FIG. 1 shows another perspective view of an aircraft, a two-winch, two-point suspension system and containerized load, with an inflated pad shown directly below. Here a magnet in each detachment device is positioned so it can be removed by ground personnel.

A simple scheme for unloading and detaching a containerized load onto loading platforms is portrayed in FIG. 1. The platform may be either stationary or unstationary, as in the case of a platform on a ship at sea. To illustrate how this scheme would be applied to an onshore unloading situation, a helicopter hoist suspension system, load and inflated pad are protrayed in FIG. 1. Load detachment device 10 is the coupling assembly between hoist cable 5 and load support cable 4, enabling one or more persons to quickly release the load by pulling on cords 2. In this example, the pilot endeavors to keep his helicopter 6 in motionless hover above pad 8 as load 1 is lowered. Usually someone on the ground as well as someone aboard the helicopter observes the load's descent. When the load is a few feet above pad 8, either a crewman or the pilot would slow down the load's descent to avoid a severe dynamic impact on the loading platform. When load 1 settles on pad 8, a person on the ground or platform area would pull on cords 2 to remove magnets 14. As soon as magnets are removed, hoist cables automatically detach, since scissorlike part B immediately collapses.

Figure 2:
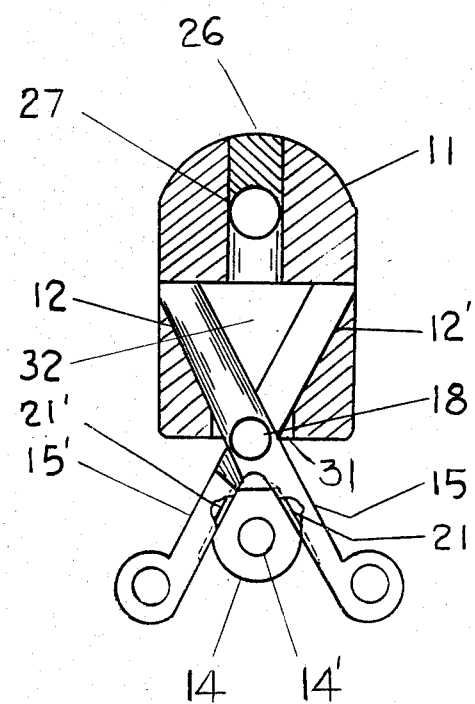
FIG. 2 shows an assembly view of a load detachment device of FIG. 1, consisting of three parts, a cylindrical upper member with a cavity for accepting the blades of a scissorlike lower part. A third part is a wedge-shaped holed magnet.
Figure 3:
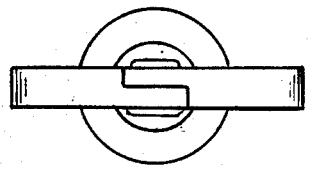
FIG. 3 shows the bottom view of FIG. 2, without the magnet.
Figure 4:
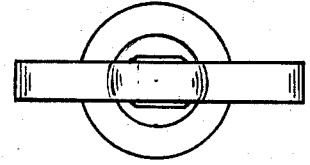
FIG. 4 shows the bottom view of FIG. 2, with the magnet.

A detailed coupling assembly of detachment device 10 is shown in FIG. 2, showing parts A, B, and C. Part A is shown in section to provide information on the cavity's shape 32 within cylindrical member 11. The scissorlike part B is identified by numeral 12. The two blades 12 and 12' are pivoted at 18, and are held together by a short rod 18 which is kept in place by peening over both of its ends, but still allowing free movement of blades 12 and 12'. Handles 15 and 15' of blades are provided with holes for cable attachment. Member 11 also is provided with hole 27 for cable attachment. Cord 2, FIG. 1, is attached to hole 14' of magnet 14, and may be used by ground personnel to remove magnet. Magnet's exterior is convex, while handle's 15 interior 21 is concave to enable magnet 14 to stay in position. An alnico or ceramic magnet should have sufficient holding power under load oscillation conditions to preclude the need for a spring between handles 15 and 15' to keep magnet 14 in place. The magnet should make good contact with noncorrosive surfaces 21 and 21'. Effectively noncorrosive malleable iron could be used for surfaces 21 and 21', properly fastened to stainless steel handles 15 and 15'. A detail of a slightly different shaped magnet with a rod passing through its hole is shown in FIG. 12. If the magnet should get stuck when attempting to remove it by cord 2, it can always be removed by prying it out by inserting a tool, such as a screw driver, at opening 19. After load removal, the magnet would be reinserted between handles 15 and 15' of the scissorlike lower part, so that this part can be used again for coupling a load to the hoist cables. FIG. 3 is a bottom view of assembled detachment device 10, without magnet 14 in order to more clearly show the intersection between handles 15 and 15'. FIG. 4 is another bottom view with the magnet in place. Bottom opening of cylindrical member 11 is indicated by numeral 31.

Figure 5:
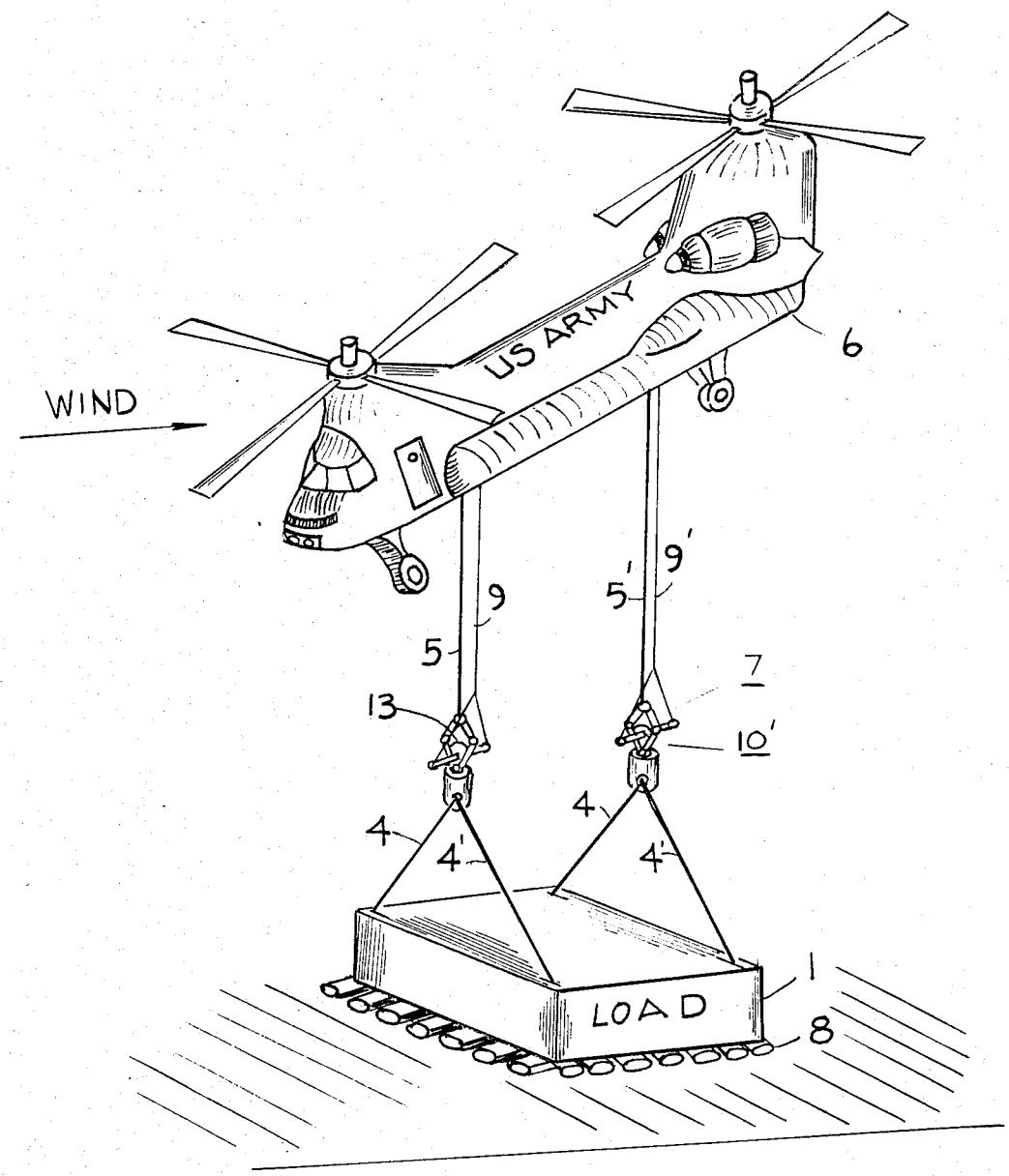
FIG. 5 shows a perspective view of the aircraft, two-winch, two-point suspension system and containerized load. An inflated pad is shown directly beneath the load. Two detachment devices are shown. A magnet in each device is positioned so it can be removed by the pilot.
Figure 6:
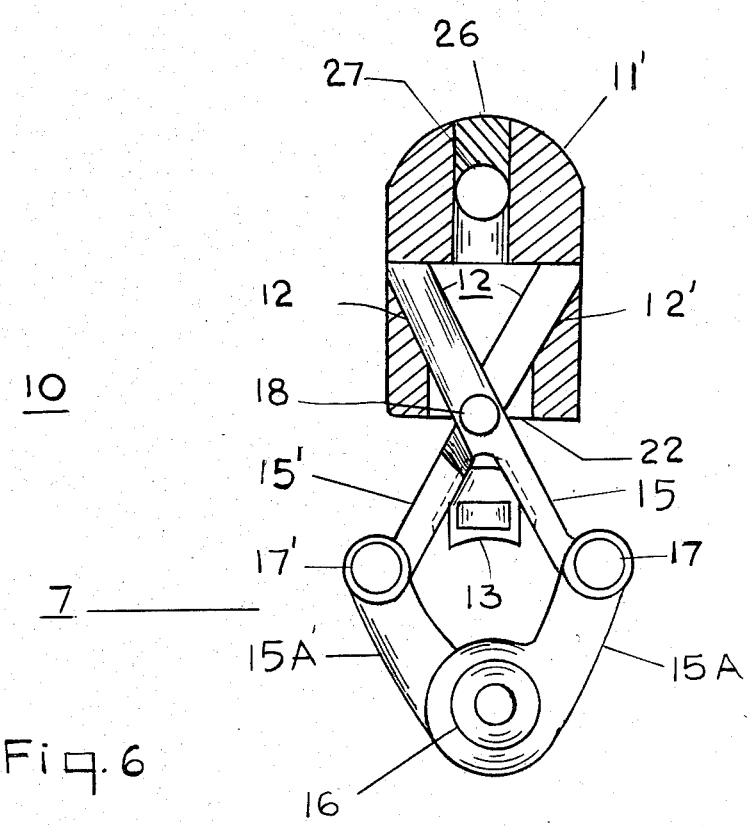
FIG. 6 shows another assembly view of a load detachment device. of FIG. 5, consisting of three parts: a lower cylindrical member with a cavity for accepting the blades of a scissorlike upper part; and a third part is a wedge-shaped holed magnet.
Figure 7:
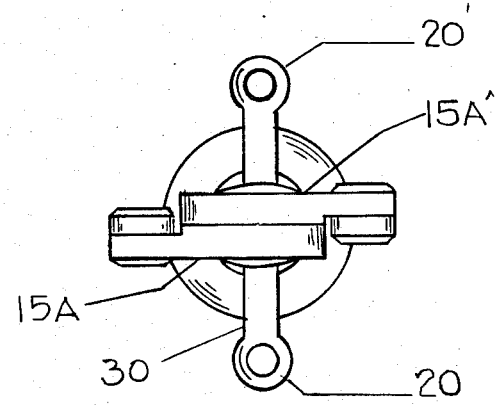
FIG. 7 is a top view of the assembly of FIG. 6.
Figure 8:
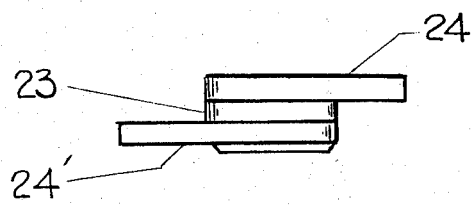
FIG. 8 is a top view of assembly of FIG. 6 without the cylindrical lower part and with a spacer between the modified second pair of pivoted members.
Figure 9:
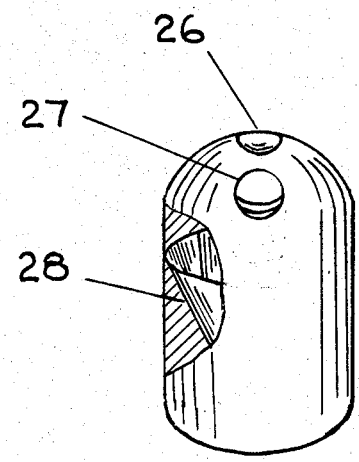
FIG. 9 is a perspective view of the cylindrical bottom or lower part.
Figure 11:
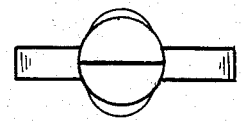
FIG. 11 is its top view.
Figure 10:
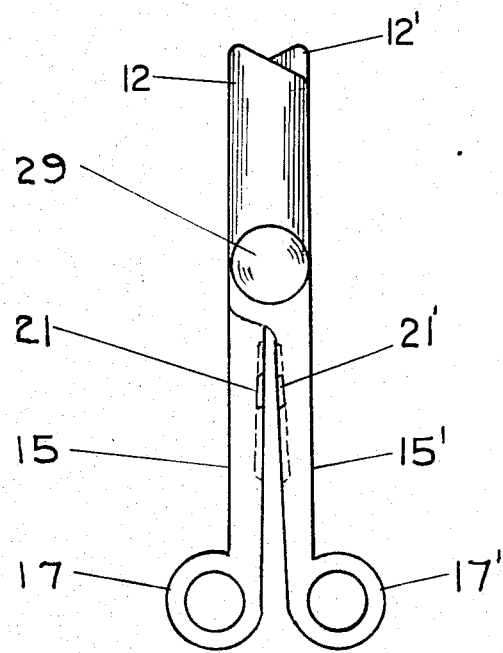
FIG. 10 is a side view of the scissorlike lower part, with the blades closed together.

A slightly different load detachment device 10' is shown in perspective view of helicopter, hoist cables and load, FIG. 5. In this illustration the pilot endeavors to keep his helicopter in hover above a loading platform as containerized load 1 is lowered. When load 1 settles on platform, a crewman in helicopter 6 pulls on cords 9 and 9' to dislodge magnets 13 from scissorlike upper part 7, FIG. 6. Unlike device 10, magnet stays and remains within opening between handles 15 and 15' and arm 15A and 15A'. When magnets 13 are dislodged, scissorlike parts 12 collapse and assemblies 7 are removed from cylindrical members 11'. Cords 9 and 9' are attached to rods 30 via openings 20 and 20' to enable magnet 13 to be dislodged from its place between handles 15 and 15'. When scissorlike assemblies 7 are removed from cylinders 11', the latter fall along side load 1. If cables 4 and 4' are hooked to hole 27, then it would be a simple matter for ground personnel to remove cylinders 11' to be reused for other loads. Otherwise cylinders 11' could stay with load 1 and be removed at a later time. This would apply to detachment device 10, FIG. 1. However, in this case, scissorlike assembly 12 in facing the load and cables 4 and 4' could be hooked to holes in handles 15 and 15'. Assembly 12 could be removed by removing hooks, enabling assembly 12 to be reused for another operation. Note that cylinder opening 22, FIG. 6, is larger than cylinder opening 31, FIG. 2. Detachment device 10' is shown in FIGS. 6, 7 and 8. In FIG. 6 one notices that upper part 7, which includes part 12, includes a second pair of pivoted members 15A and 15A'. The latter members are pivoted at 17 and 17' to handles 15 and 15' and at 16. All pivot points hold members firmly in place and still allow free movement of the respective parts, so blades 12 and 12' can collapse when weight of load 1 is relieved at contact with loading platform. Blades of scissorlike part 12 are pivoted at 18, as in FIG. 2. As in FIG. 2, magnet 13 keeps handles 15 and 15' and blades 12 and 12' apart, while load 1 is coupled to upper hoist cables 5 and 5'. The load is decoupled after it comes to rest on the loading platform by an aircraft crewman or by the pilot, by pulling on cords 9 and 9', and dislodging magnet 13. The cords with upper part of device 10' would be taken up on spools as the hoist cables are elevated on the forward and aft hoist reeling mechanisms. It is possible that the spools could be attached to the hoist reeling mechanisms. Cords 9 and 9' are attached to eyelets 20 and 20' or rod 30 passing through hole of magnet 13, as shown in FIGS. 5 and 7. As in previous FIG. 2, magnet edges are convex-shaped while inner surfaces of handles 15 and 15' are concave-shaped. In addition, inner surfaces of handles are ferrous material to enable magnet part 13 to be attracted to them. In addition, arms 15A and 15A' are shaped bow-legged to enable magnet 13 to move to and make contact with surface 13' of pivot 16, when pulled, so that blades 12 and 12' can slip through cavity opening 22 of part A. FIG. 7 is a top view of assembly of detachment Device 10', shown in FIG. 6. Position of rod 30 and eyelets 20, 20' are shown to which cord 9 is attached. It should be added that cords, tied to eyelets 20 and 20', tie together above the second pair of pivoted members 15A and 15A'. Cord 9 is attached to this tied point. FIG. 8 is a top view of the second pair of pivoted members 15A and 15A', designed slightly differently to allow spacer 23 to be sandwiched between outer bow-legged members. Outer members are designated 24 and 24' to differentiate them from those shown in FIG. 7. Just the second pair of pivoted members are shown in FIG. 7, without the magnet and without part A (11'). A detailed isometric view of part A is shown in FIG. 9. A hole 26 passes through its top center, and other hole 27 passes through the side near the top, to enable a hoist cable or hook to pass through it; the latter hole is necessary while the former is optional, indicated only because it may be of assistance in forming cavity 28. Rod 30 passes through hole in magnet 13, FIGS. 4 and 5. A detail of scissorlike part A is shown in FIG. 10. In this front view the "left" and "right" halves of this pivoted assembly are indicated by 15 and 15'. The pivoted point is shown at 29, while the handle-like holed portion is shown at 17 and 17'. Top view of this pivoted assembly is shown in FIG. 11 to illustrate shapes of pivoted parts. Dashed lines 21 and 21' indicate that the inner surfaces of handles 15 and 15' are concave-shaped to enable magnet 13 to be positioned and held in place more securely.

A detail of magnet 13 is shown in FIGS. 12, 13, and 14. Rod 30 is shown passing through hole in magnet at 14'. This magnet is used in device 10', FIG. 6. Note the magnet's flat sides 31 and 31', FIG. 12, to enable scissor's blades, to collapse sufficiently. Sides 31 and 31' of the magnet's lower portion are convex-shaped to enable magnet to recess into concave inner surfaces of handles 15 and 15', FIG. 6. Magnet's top surface is concave-shaped in order to follow curvature of exterior surface of pivot 16, FIG. 6.

Cylindrical-shaped lower part A may be simplified somewhat through an alternate design, a doughnut-shaped ring, FIG. 15. In this simpler design, hoist cables 4, 4' would be attached to holes 41 and 41' of eyelets 42 and 42', welded to ring 43, as shown. Numeral 44 points to indentations within ring 43 to accommodate blades of upper part of device 40, FIG. 19. Indentations assist blades 12 and 12', FIG. 2, to stay in place were a ring instead of a cylinder used. This is a desirable feature.

Figure 17:
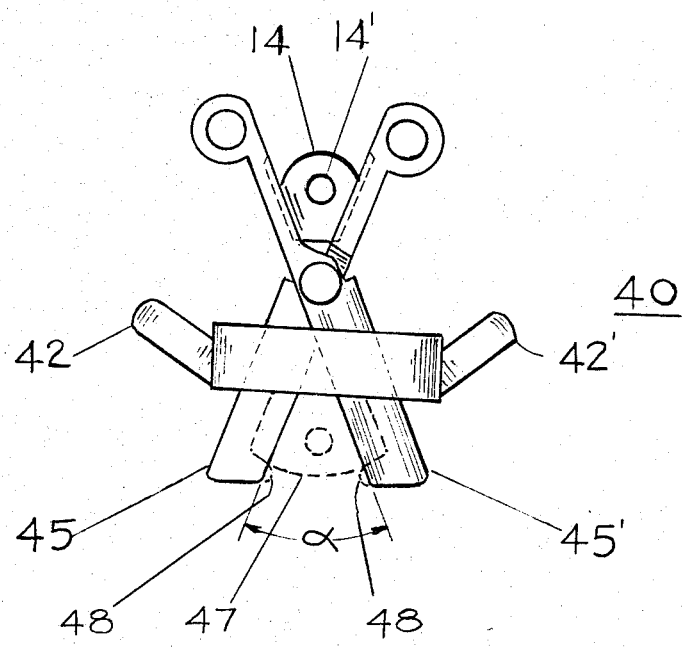
FIG. 17 is a front assemble view of a modified load detachment device, showing indentations in each of two blades of the scissorlike device for accommodating and properly positioning the ring of FIG. 16. The magnet may be placed either at the top or at the bottom of the assembly, depending on whether ground personnel or the pilot is to remove it.

Another desirable feature would be to enlarge blades 12 and 12' and provide indentations in the blades to accommodate ring 43. FIG. 17 shows an assembly view of the detachment device, similar to that shown in FIG. 19. Here, in addition to the interior indentations of ring 43, blades 45 and 45' are widened in order to provide indentations 46 and 46' for accommodating ring 43. Indentations 44 of ring 43 prevent rotation of the blades of scissorlike part, while exterior indentations in 45 and 45' assist in keeping ring 43 in position vertically.

Figure 18:
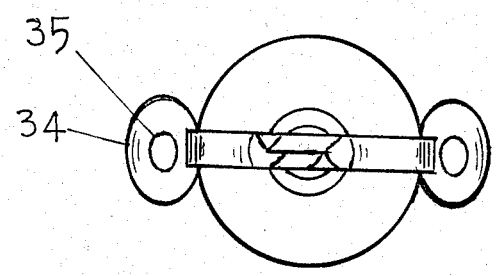
FIG. 18 is a bottom view of the assembly of FIG. 17, without the magnet.
Figure 19:
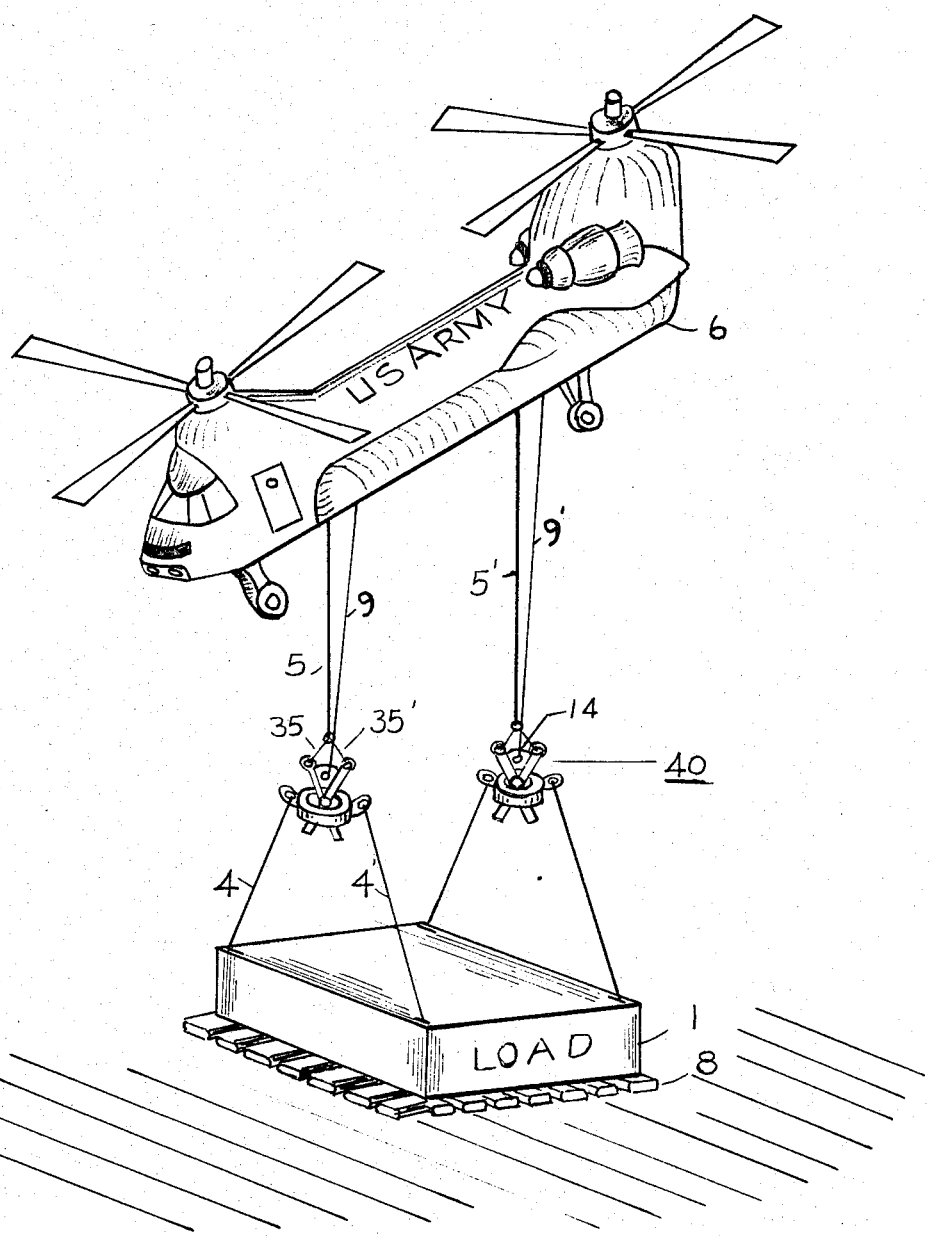
FIG. 19 shows a perspective view of the aircraft, the two-winch, two-point suspension system and the containerized load. Two load detachment devices incorporating the design of FIG. 17 are shown. A magnet is shown at the upper part of each.

Assembly of detachment device 40, FIG. 19, is shown in FIG. 17, similar to that shown in FIG. 2, except for the features described above. Note that magnet 14 remains the same. The ring member is the same as shown in FIG. 15. However, blades 45 and 45' have been modified. FIG. 18 is a top view of the assembly. Angle α is approximately the same as the angle between the blades of FIG. 2. Magnet 14 may be removed by a single cord fastened to its hole 14' simply by being pulled by the aircraft crewman. Bumps 48 retain magnet 47 in place while load is in suspension. An alternate location for magnet 14 could be between interior blades 45 and 45', FIG. 17, to enable removal by ground personnel by pulling on a cord, attached to hole 14'. It is shown in dashed lines.

FIGS. 20A and 20B show an assembly of just the scissorlike portion of device 40. Note indentation 46 in the closed or collapsed blade 45. FIG. 20B is bottom view of FIG. 20A. The actual sizes of this member and other parts of device 40 depend upon the weight of load 1 and the dynamics of the system. The parts are not necessarily drawn to scale. FIGS. 21A and 21B show detail of a single blade 45 and handle portion 15. Again, FIG. 21B is a bottom view of FIG. 21A. Cut-out 46 in blade 45 is shown, as well as hole 18' for peened axial member 18.

To possibly eliminate the need for a magnet between blades of scissorlike member of detachment device, angle α between blades has been increased to angle α' and the ring member has been moved near the central pivot point 52 of part B, FIG. 22. Since angle α has been increased, cut-outs in blades 45 and 45' have been eliminated as unnecessary. Blades 45 and 45' are semi-round as in FIG. 21B. Orientation of assembled device, FIG. 22, may be either as shown or upside down. In the upside down position a magnet between handles 51 and 51' would be required to prevent their collapse while supporting a load. In addition, with four eyelets equally spaced around ring 53, single-point suspension of load 1 would be possible. A cable, such as 4, attached to each corner of load 1, would be fastened to an eyelet 54 of ring member 53.

Figure 24:
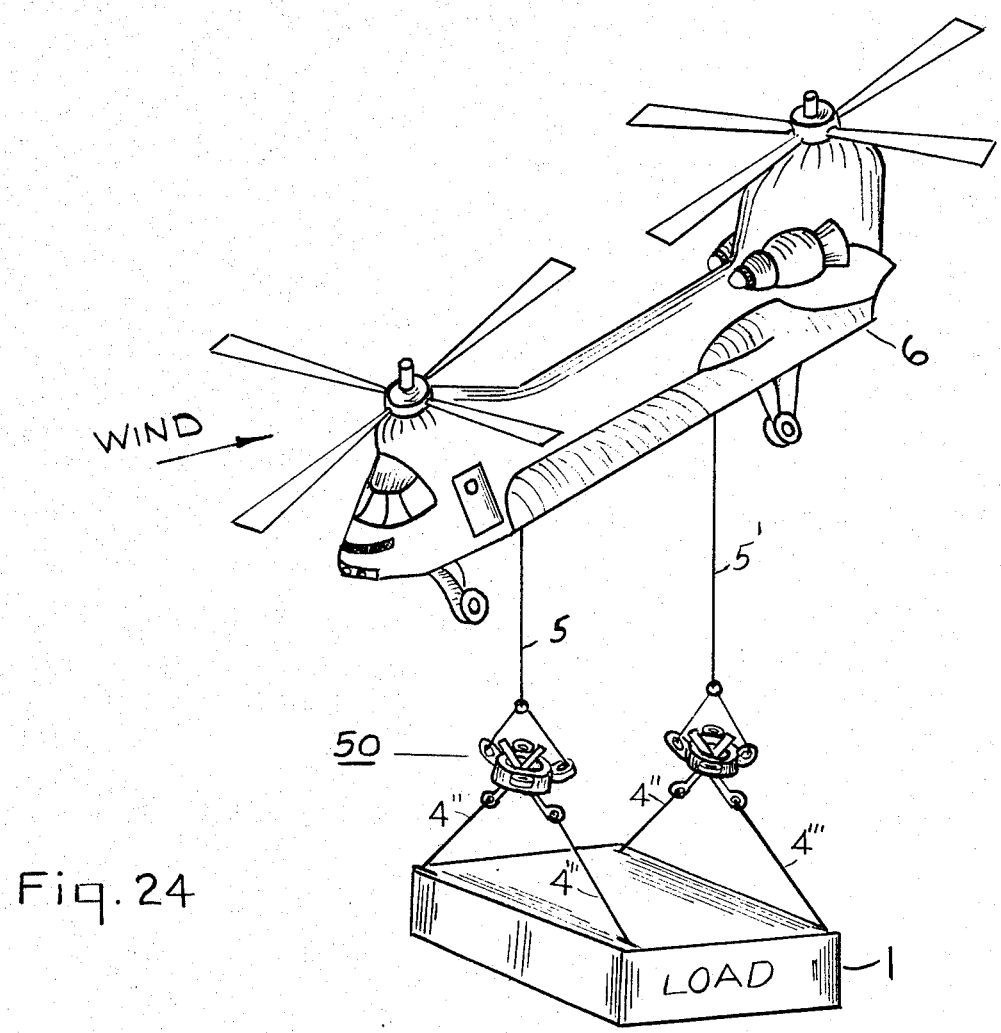
FIG. 24 is a perspective view of the aircraft, two-winch, two-point suspension system and load.

By having angle α' greater and by orienting device 50 as shown in FIGS. 22 and 24, it is possible to eliminate the magnet shown in the previous assemblies of the detachment device. Blades 49 and 49' cannot slip through central opening of ring member 53 unless rod 4" or 4"' is cut or becomes detached. A two-hoist, two-point suspension system is shown in FIG. 24, requiring two detachment devices 50. Each hoist cable should be strong enough to support the entire load 1, should one of the hoists be cut or detached. To avoid an imbalanced condition of the aircraft, which could provide a hazard, the second hoist cable could be detached allowing load 1 to fall free of the aircraft. If one hoist cable should become detached above the loading platform, as a precautionary measure a net, beneath load 1, as shown in FIG. 1 U.S. Pat. No. 4,054,103, would be advisable.

Bottom view of device shown in FIG. 22, is provided in FIG. 23. Note four equally-spaced eyelets are shown welded to the exterior of ring 53. Only two diagonally opposite eyelets need be used, as shown in FIG. 24. All four eyelets would be used for a single-point operation. FIG. 22 shows section of ring 53 along line 22, FIG. 23. With ring member 53 centrally located about scissorlike member 50', and with angle α large, the two parts, A" and B", FIGS. 22 and 23, would behave as a single body, until the weight of load 1 is relieved; at which time scissorlike member 50' would collapse automatically and slip through central hole of ring 53. Without a magnet this design is for lighter loads.

In FIG. 23, numeral 52 points to a peened over axial member connecting together scissorlike halves 49 and 49' of member 50'. This axial member should be strong enough to support entire load 1. Similarly, each blade 49 of member 50' should be sufficiently sturdy to support entire load 1. Top and bottom portions of hole in member 53 slope to follow curvature of blades 49 and 49' and handles 51 and 51' as indicated by numerals 55 and 55', respectively.

Figures 25A, 25B:
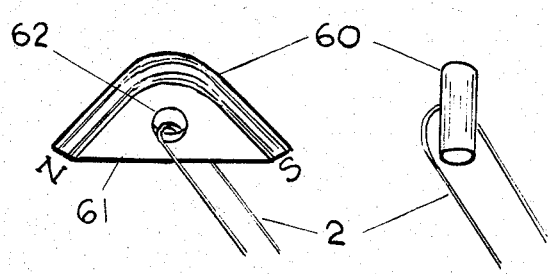
FIG. 25A is a front view of magnet for temporarily inserting between handles of detachment device show in FIG. 22.
FIG. 25B is its side view.

For load acquisition operation, the scissorlike member 50' would have its blades inserted into hole of ring member 53, in the collapsed condition, with blades closed together. After blades are inserted through the hole, they are separated as shown in FIGS. 22 and 24. With rods 4" and 4"' uplifted, one could temporarily place a magnet similar to magnet 14, FIG. 2, or a V-shaped magnet, between inside surfaces of handles 51 and 51'. The V-shape, to follow inside surfaces of handles, could be acquired by bending a ferrous metal rod 60, capable of being magnetized, as shown in FIG. 25A. Non-magnetic, non-metallic material 61 would be firmly cemented and fastened to the inside surface of rod 60. Hole 62 permits a cord to be passed through to enable ground personnel to remove magnet by pulling on cord 2, when device 50 has been lifted sufficiently by hoist cables 5 and 5'. Then parts A" and B" of device 50 would be locked firmly in place, until tension in rods 4" and 4"' is again sufficiently relieved. The time required to engage parts A" and B" could be a matter of seconds for helicopter slung loads. For a crane or derrick the time required for engagement would be even less.

As a convenience, the military services are interested in the option of using electrical signals to remotely perform an operation, such as disengaging the load from its hoisting mechanism. Of course, provision should be made also for mechanical disengagement should the electrical means fail. With this in mind, wedge-shaped member 65 is shown in FIG. 26 with solenoids 66 and 67. The scissorlike device 50' is shown in dashed lines, so the wedge-shaped member can be illustrated more fully. Device 50' is provided with a hole in handle 51' to accommodate protruded plunger 66'. Wedge-shaped member 65 fits snugly under device 50' between handles 51 and 51' as an extra safety measure to keep release mechanism 50 engaged while load 1 is suspended, as shown in FIG. 24, without member 65. Member 65 is shown partially in section to expose cylinders 66 and 67. Cylinder 66 is a pull-type solenoid, while cylinder 67 is a push-type solenoid. A suggested solenoid is Oak Industries part No. 67-181024DC-AY, which is approximately 1⅛" long and 7/16" in diameter. The plunger itself is approximately 5/32" in diameter and has a stroke capability of ½" with a 2¼ pull in ounces. Other size solenoids with other pulls and strokes are available off-the-shelf to suit many requirements. The same size solenoids are available in push-type. Solenoid 67 is the push type to assure that member 65 is dislodged when plunger 66' of cylinder 66 is retracted. A flat-surfaced bump or protrusion may be provided under blade 49' for plunger 67' to push against. Then plunger 67' of cylinder 67 pushes against the flat center portion of scissorlike device 50' to ensure the disengagement. An instant after voltage E is applied to solenoid coil 69, FIG. 29, voltage E is applied to solenoid 67 to ensure disengagement of member 65. A solenoid has a cylindrical member 68 on which an insulated conductor 69 is wound in the form of a helix, in one or more layers. When an electric current is passed through the wire wrapped around the cylinder, a magnetic field is produced, the direction of which may be determined by the "corkscrew" law, to either pull or push an iron bar or rod along the coil axis. If plunger 66' in the form of a magnetic rod is placed in the solenoid field, then the N-pole of the magnet will tend to move along the coil axis in the direction of the lines of force and be pulled into the solenoid, assuming it to be the pull-type. If the current in the solenoid is reversed, its magnetic field will reverse and the magnet now will be repelled. Soft-iron plungers also may be used instead of cylindrically shaped magnets. The plunger is magnetized by the current in the solenoid. The polarity of the soft iron plunger is the same as that of the bar magnet. However, if the solenoid current is reversed, the fields of both the solenoid and the plunger will reverse and the direction of pull on the plunger will be unchanged.

In order to reduce the reluctance of the return part of the magnetic field and protect the windings, an ironclad construction is used. With this type construction, a large pull over a short distance is obtained at the stroke's end, unless a hole for the plunger is bored through the iron cover at the stroke's end. Should the electrical signal fail to operate solenoid 66, a nail may be applied through hole at plunger 66' to knock plunger back into cylinder and thus free member 65. Also, wedge-shaped member 65 could be removed with the aid of either a pair of pliers or a monkey wrench, thus enabling release of load from the hoist mechanism.

Input power comes from a two wire line which provides E volts for the circuit. One of the three wires, (between switches 1 and 2), is common and ground. In the switch positions shown, FIG. 29, no complete path for current flow to the solenoid extracts. If the position of either switch 1 or 2 is changed, there will be a complete path and the solenoid will be activated. This means that the solenoids in FIG. 28 can be operated from either switch 1 or switch 2. Switch 1 is located at the load location (preferable at the detachment device), and switch 2 is located in the aircraft, either near a crewman or near the pilot, if the load is suspended from a helicopter.

In the above description, wedge-shaped member 65 is provided with push and pull solenoids. Solenoid 66 may be the rotary type instead of the pull-type. The slot in handle 51' cold be rectangular-shaped and so could plunger 66'. When using a rotary solenoid, with solenoid circuit unactivated, the plunger would be in engage position, that is, the plunger would project into slot of handle 51'. When solenoid circuit is activated by closing either switch 1 or switch 2, the plunger would rotate and retract in solenoid 66 enclosure. Rotary solenoids are manufactured by various components, such as Ledex, Vandalia, Ohio 45377; Oak Industries, Inc., Crystal Lake, Ill. 60014; Regdon Corp., 3715 Grand Blvd., Brookfield, Ill. 60513. With a wedge-shaped member, this design is for heavier loads than without it.

Figure 30:
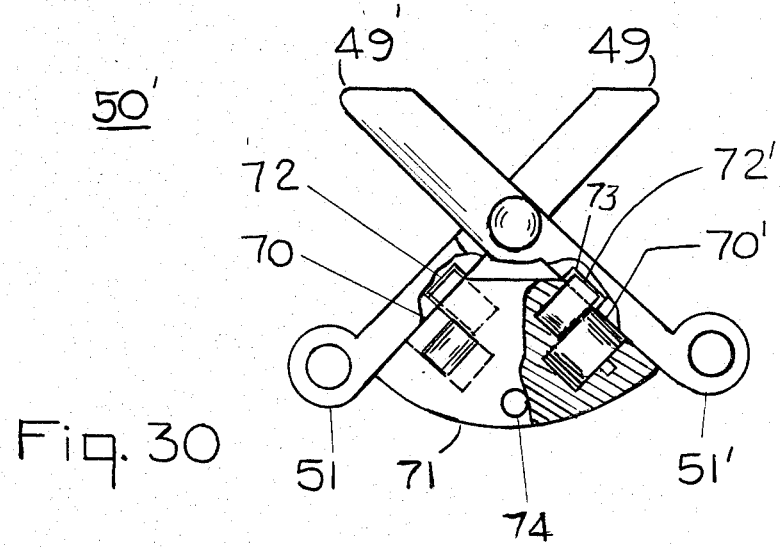
FIG. 30 is a front view of a wedge-shaped member with two solenoids located within it, both solenoids being of the rotary type. A scissorlike device to which the wedge-shaped member is attached is included in this view.
Figure 31:
FIG. 31 is a bottom view of the above assembly.
Figure 32:
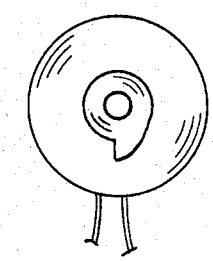
Figure 33:
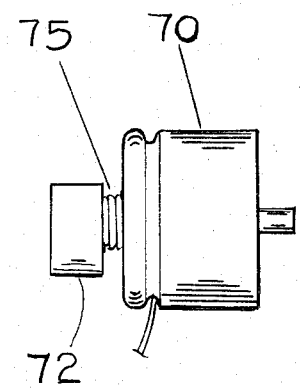
FIG. 33 is its side view, showing the plunger in more detail.
Figure 34:
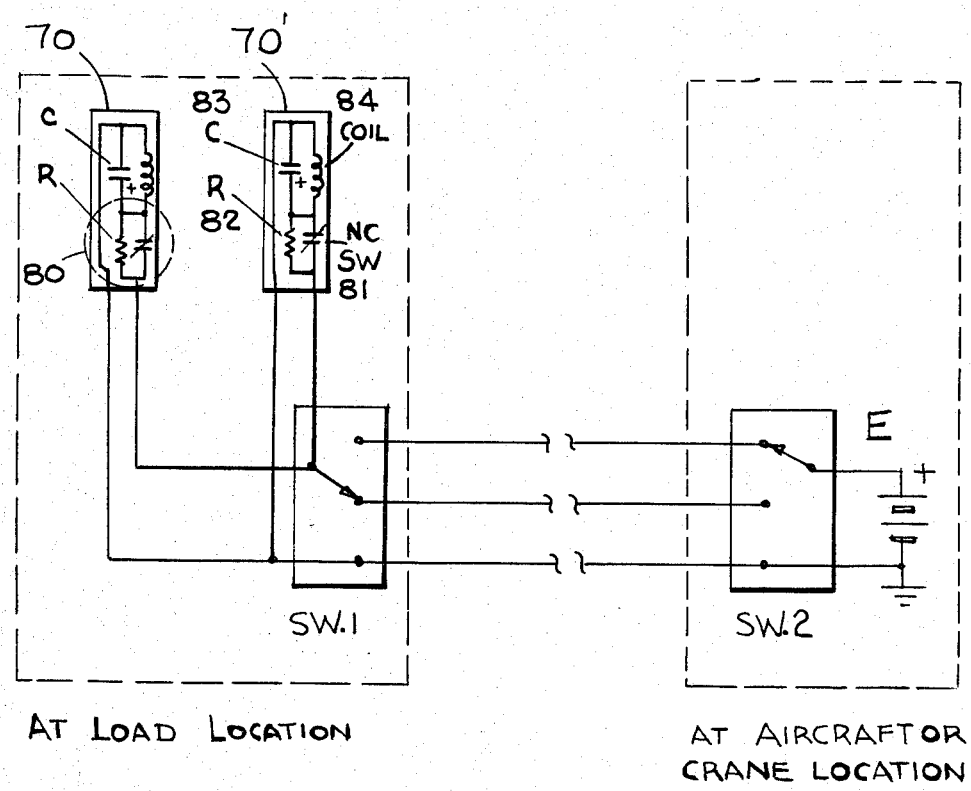
FIG. 34 is a circuit diagram of the two solenoids wired to two switches, a battery or voltage supply. Each switch is capable of activating both solenoids.

In the case of the rotary-type solenoid, such as 70, FIG. 30, the solenoid would be imbedded inside wedge-shaped member 71; FIG. 30 shows a front view of member 71, while FIG. 31 shows an end view. Two solenoids 70 and 70' are shown and they could be identical. Several manufacturers supply such solenoids off the shelf, such as Ledex of Vandalia, Ohio. The solenoids are inserted inside of 71, adjacent to the inside surfaces of handles 51 and 51'. Each solenoid has a shaft into which is fitted a latch bolt 72', fashioned to enter a recess in each handle with a turn of, say, 60°. Bolt 72' is normally protruding into recess 73, when solenoid 70' is unexcited. When voltage E is applied, then latch bolt rotates and member 71 is freed from its position between handles 51 and 51' assuming load 1 has made contact with a loading surface. A light coil spring 75, FIG. 33, on shaft of solenoid helps bolt member 71 maintain engagement with handles 51 and 51', when solenoids are unexcited. To remove member 71 manually and mechanically one could consider the flat inside surface surrounding recess 73 to possess the function of a latch strike plate which would enable forcible removal. The latching operation would be similar to that of an electric door lock, as manufactured by Trine. Two solenoids 70 and 70' are shown to assure the retension of member 71, between handles 51 and 51', when a load is suspended by a hoist cable mechanism. When the load has made contact with a platform and cables suspending load are slackened, then solenoids 70 and 70' are activated, at which time wedge 71 releases its hold and drops down, free of scissor-like member 50'. A hole is provided 74, in member 71 for cord attachment to facilitate its recovery and reuse. Solenoid 70' is exposed by a partial section of 71. FIG. 30, to show additional detail of solenoid, bolt and recess. It should be mentioned that in FIG. 24, showing load 1 suspended, 4" and 4'" are rods, not cables as cables would lengthen and device 50 would disengage under a heavy load, without a wedge. FIG. 34 is a circuit diagram. Solenoids 70 and 70' are inserted inside member 71, FIG. 30, with ventilation holes, not shown, to allow cooling of the solenoid coils and their environs.

Where there is a likelihood that an operator might close either switch 1 or 2 for a long period of time, then a solenoid large enough to provide the torque needed on a continuous basis may be specified. If the application permits a higher coil temperature rise, one could specify a smaller solenoid with a high temperature coil to obtain continuous duty operation at a higher temperature level. An alternate approach is to use a smaller solenoid with an intermittent duty cycle input power by using a hold-in resistor circuit 80, FIG. 34, to reduce current to a point where torque is sufficient to maintain the solenoid in the energized position. One method of accomplishing a reduced coil current is to use a normally closed (NC) switch in parallel with a hold-in resistor. When a switch closes the circuit, full voltage is initially impressed across the solenoid coils, by-passing the resistor 82 through the NC switch. As the solenoid approaches the end of its stroke, a mechanical connection opens NC switch, inserting resistor 82 in series with the coil, thus reducing the solenoid voltage to a point where the power input is high enough to allow the solenoid to hold in and still stay within its normal heat dissipating range. Capacitor 82 is placed across solenoid coil 84 to function as an arc suppressor. Another alternate approach for obtaining maximum output power at the start is two provide a solenoid with two coils in parallel. Both coils are energized initially to obtain higher force and speed of operation. Then one coil is switched out of the circuit by means of a time delay relay. Then a single coil performs the continuous holding function. Numeral 80 points to the mechanical hold-in resistor circuit, FIG. 34.

Figure 35A:
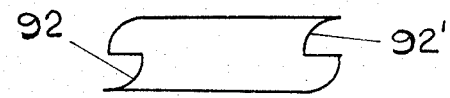
FIG. 35A is a top view of a wedge-shaped member for keeping the scissorlike blades of a decoupling device apart. It is placed as shown in dashed lines, FIG. 17, to prevent the possibility of the scissorlike blades from collapsing under very heavy load, gusty environmental conditions.

FIG. 35A is a top view of a wedge-shaped member for keeping the scissorlike blades of a decoupling device apart. It is placed to prevent the possibility of the scissorlike blades from collapsing, when the load may be swinging under heavy load and wind gust conditions. In FIG. 19 this member would be placed at the bottom of device 40. For such placement it would be a permanent magnet. Its placement is shown in dashed lines, FIG. 17. In FIG. 24, showing the aircraft, load and coupling device, this member would be placed at the top of device 50. To be more specific, it would be placed at the top, between blades 49 and 49', FIG. 30.

Figure 35B:
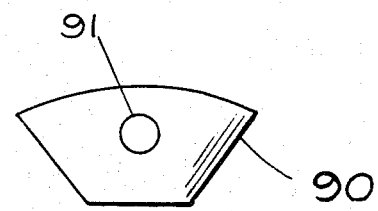
FIG. 35B is a front view of the wedge-shaped member.
Figure 35C:
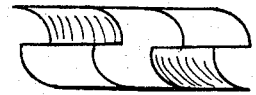
FIG. 35C is a bottom view of the member. It is oddly shaped so it can fit snugly between the blades of a scissorlike device.

Wedge-shaped member 90 is shaped so it would fit into and accept the shape of the scissorlike blades in their opened position, shown in FIG. 30. FIG. 35B is a front view of the wedge-shaped member. FIG. 35C is a bottom view of the member. It is oddly shaped so it can fit snugly between blades 49 and 49'.

The wedge-shaped member if FIG. 35B can be removed in the same manner as the wedge-shaped member 14, FIG. 17 and FIG. 19, by pulling on a cord passed through hole 91. Well lubricated surfaces 92 and 92' would prevent member 90 from being stuck. However, should member 90 become stuck or should cord 9 break in attempting to remove it, member 90 can be pried loose mechanically. It should be borne in mind that when load 1 has made contact with the loading surface and support cables 5 and 5', FIG. 24, then scissorlike blades will automatically open, allowing member 90 to become dislodged and removed, play being existent between parts A" and B".

Although the cross section of each of the blades 45 and 45' has been shown to be shaped semi-circular, as implied in FIG. 20B, it could be rectangular or channel shaped, with the channel ([) portion extending outward. This latter shape could provide a greater resistance to bending for the same bending force. That is, less material would be used for the channel section for the same bending stress as for the semi-circular cross sectional blade.

Figure 37:
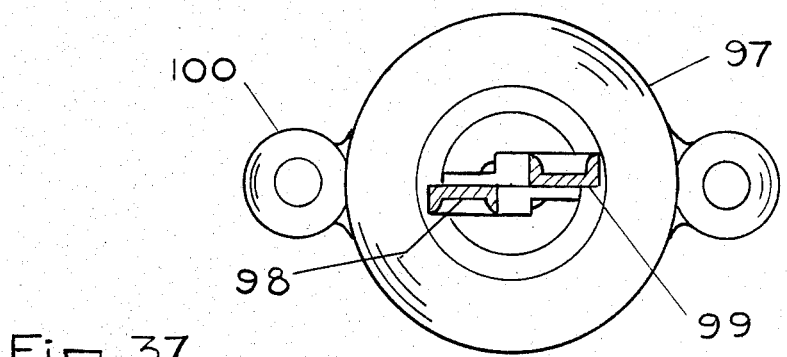
FIG. 37 is a partial sectional view viewed from its top side to include sections of the channel-shaped blades.
Figure 36:
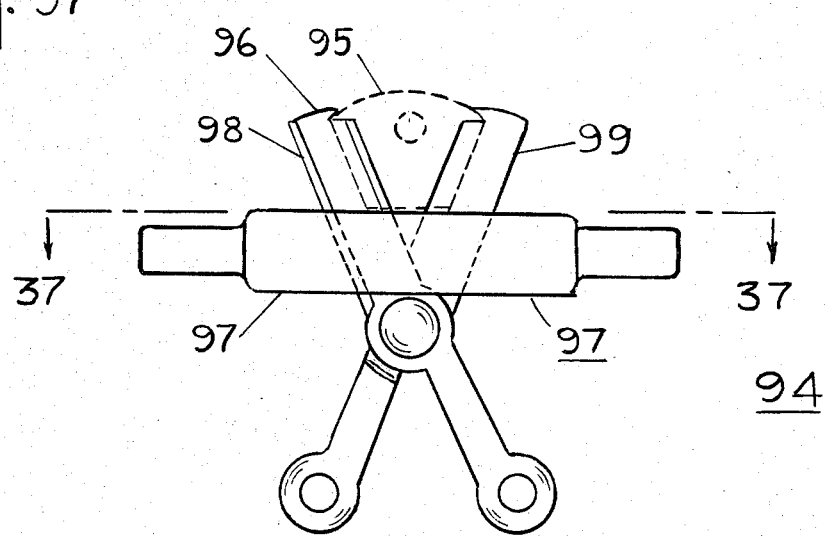
FIG. 36 is a front view of another assembly of a scissorlike part and the doughnut-shaped part making up the coupling device.
Figure 38A:
FIG. 38A is a top end view of a wedge-shaped member to fit between the open blades of the scissorlike part, shown in FIG. 36.
Figure 38B:
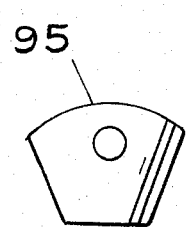
FIG. 38B is its front view.
Figure 40:
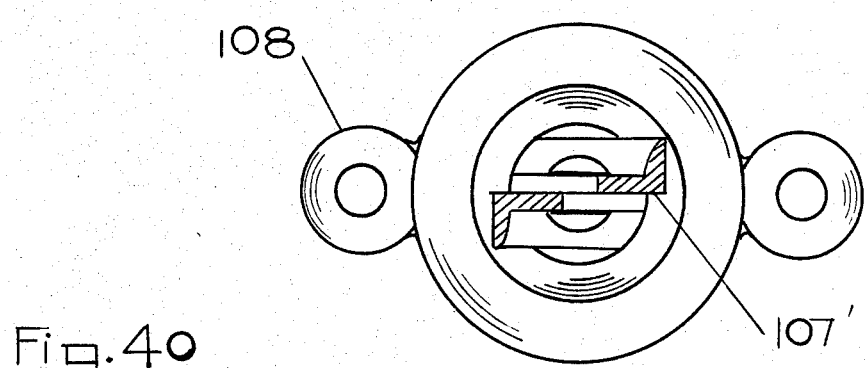
FIGS. 39 to 41B are similar to FIGS. 36 to 38B. The main difference is the substitution of an angle-shaped blade for a channel-shaped blade.
Figure 39:
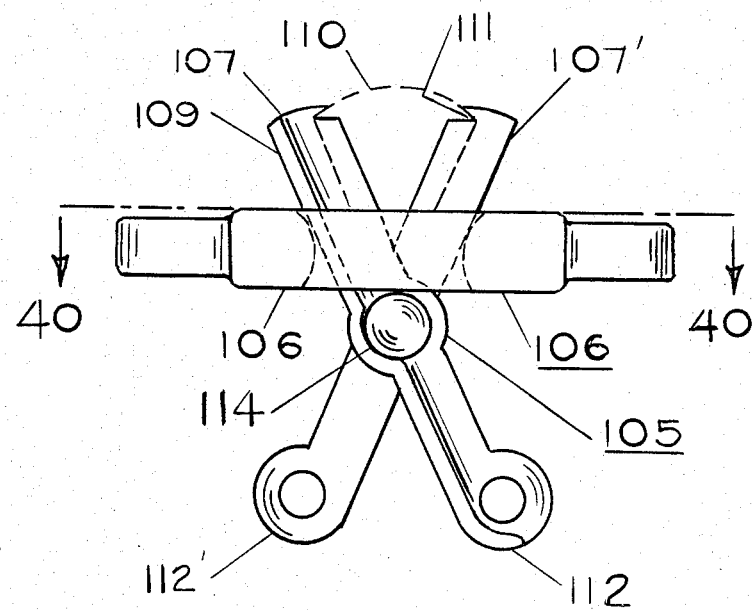
Figure 41A:
Figure 41B:
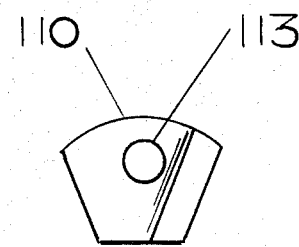

FIG. 36 shows a front view of an assembly of a scissorlike part and the doughnut-shaped part 97 making up coupling device 94. Ring 97 has two attached eyelets 100. It should be noted that blades 98 and 99 are channel-shaped to provide greater resistance to bending under heavy load conditions. A wedge-shaped member 95 is shown in dashed lines to show where it would fit between blades 98 and 99. The purpose of projection 96 is to keep the wedge-shaped member in position under suspended load conditions. Member 95 keeps blades 98 and 99 in an open position under suspended load condition. FIG. 37 is a partial sectional view taken along lines 37—37 of FIG. 36, showing a top side view of coupling device 94. A section of channel-shaped blades 98 and 99 is shown. It should be noted that this coupling device is not drawn to scale. Wedge-shaped member 95 might be shaped similar to the top view shown in FIG. 38A and the front view, FIG. 38B. FIG. 39 is another front view assembly of a scissorlike part 105 and a doughnut-shaped part 106 making up the coupling device. Ring 106 has two attached eyelets 108. Blades 107 and 107' are angle-shaped for greater resistance to bending stresses. Wedge-shaped member 110 is shown in dashed lines to show where it would fit between blades 107 and 107'. Indentation 111 in blade 107' is to keep member 110 in position under suspended load conditions. Rib 109 on blade 107 is shown extended to handle 112. FIG. 40 is a partial sectional view taken along lines 40—40 of FIG. 39, showing a top view of the coupling device. Section of angle-shaped blades 107 and 107' is shown. Peened over axle 114 holds two blades 107 and 107' together. FIG. 41A shows a top view of wedge-shaped member 110. FIG. 41B shows its front view with hole 113. Motion of scissorlike part 105 upward when load makes contact with a loading platform dislodges member 110, enabling the parts 105 and 106 to become disengaged.

Figure 48:
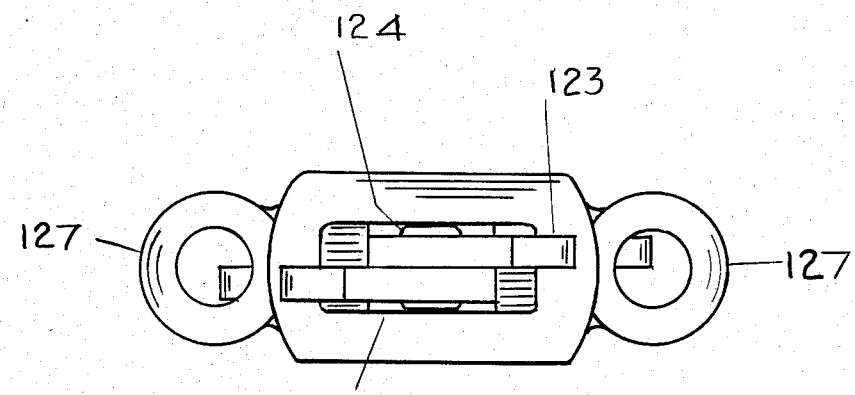
FIG. 48 is a top view of FIG. 47, which is an assembly of the scissorlike- and doughnut-shaped parts.
Figure 47:
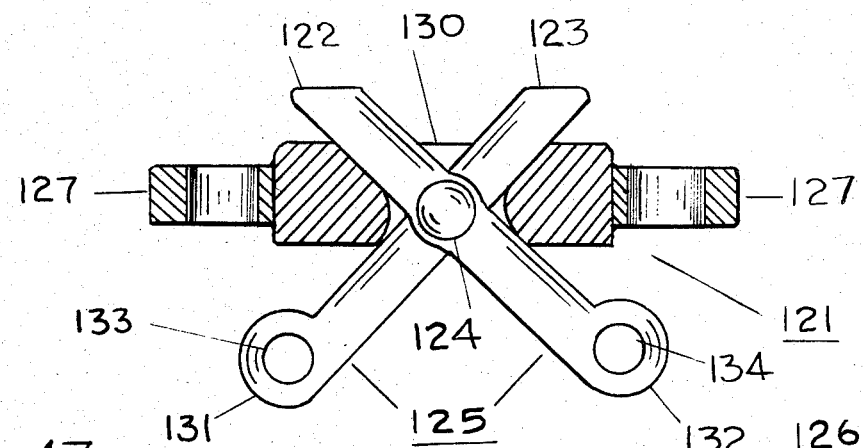
FIG. 47 is a front view of the scissorlike part, and a cross sectional view of the doughnut-shaped part in engagement.
Figure 46:
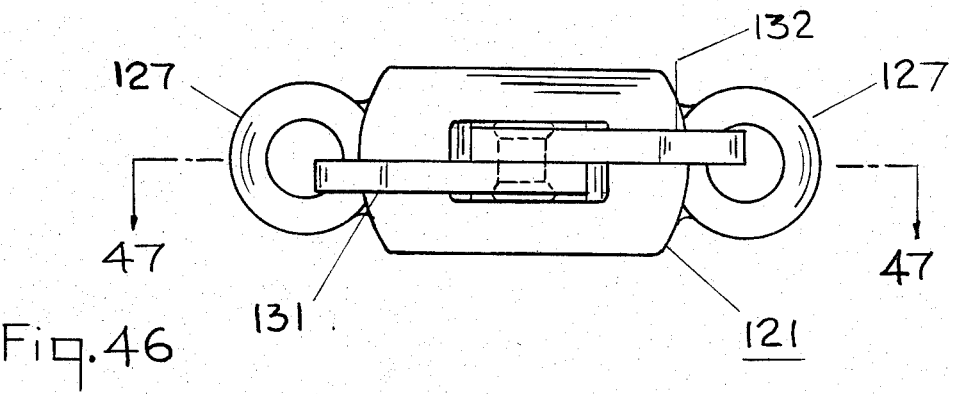
FIG. 46 is a bottom view of another assembly of a scissorlike part and an elongated doughnut-shaped part with a beveled, rectangular central hole, to constitute an assembly of the coupling device.

FIG. 46 shows a botton view of an assembly of a scissor-like part 125 and a doughnut-shaped part 121 constituting coupling 126, more clearly illustrated in FIG. 47. Front view, FIG. 47, showing a cross section of part 121, is taken along line 47—47 of FIG. 46. Part 121 has two attached eyelets 127 for attachment of hoist cables 5 and 5', FIG. 24. It should be noted that blades 122 and 123 of the scissorlike part are rectangular-shaped in cross section and hole in part 121 also is rectangular-shaped to enable snug engagement between the two parts, 125 and 121, and to prevent any rotational movement between the same two parts. Handles 131 and 132 have holes 133 and 134 for attachment of cables for supporting a load. Blades 122 and 123 are pivoted together by peened pin 124. In sectional view of part 121, FIG. 47, scissor-like part 125 is supported along its both blade and handle portions by hole 130's outer walls of part 121. FIG. 48 is a top view of coupling assembly 126.

Figures 42, 43:
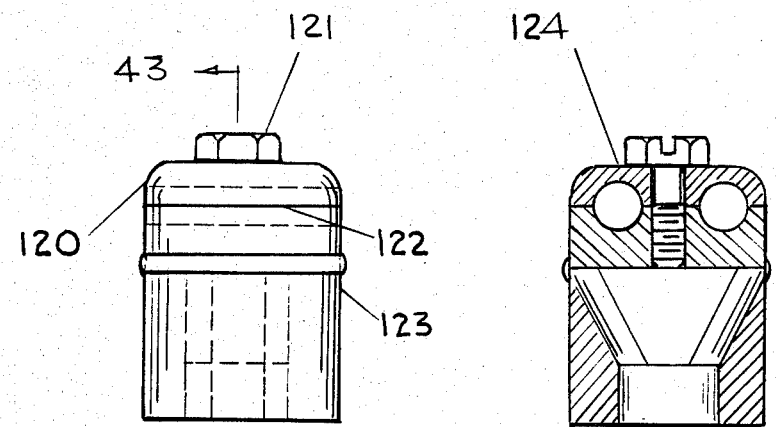
FIG. 42 shows a front view of cylindrical member, similar to member shown in FIG. 9, except for two holes shown near its top instead of one for cable attachment. Another difference is the capable of the top part to be removed by loosening the bolt on top, permitting simple removal of attached cables.
FIG. 43 is a sectional view taken along lines 43–43 of FIG. 42. Its top half may be welded to the bottom half for ease in manufacturing.
Figures 44, 45:
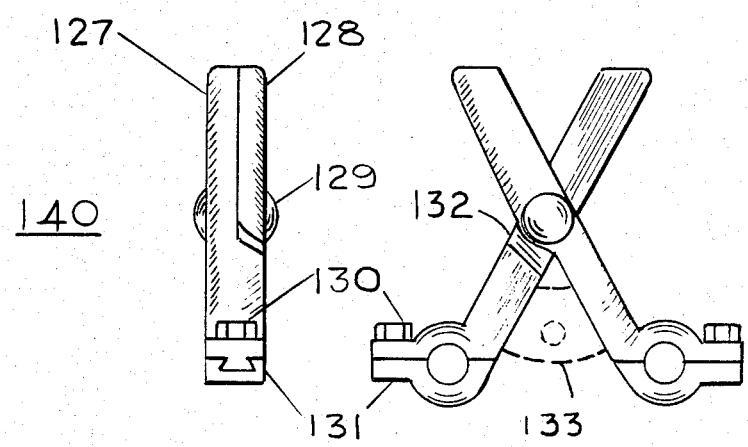
FIG. 45 is a side view of a scissorlike part of the coupling device.
FIG. 44 is a front view of the scissorlike part. Note that the bottomeholed parts of the handles are detachable for easy removal of attached cables, to enable reuse of scissorlike part.

Sometime after load 1 has been placed upon the loading platform it may be important to remove hoist cables from the bottom and top parts of the coupling device, to enable their reuse. The configurations in FIGS. 42, 43, 44 and 45 are designed to enable simple removal of the support cables after the load has been decoupled from the hoist mechanism, in particular the cables connecting the load. The upper cylindrical member 139, similar to member shown in FIG. 9, is shown in FIG. 42. Two holes shown near the removable top are for cable attachment. Its top part may be slid off by loosening bolt 121. When cover 120 is removed, attached hoist cables will fall out. This enables reuse of cylindrical member 139 for another load. FIG. 43 is a sectional view taken along lines 43—43 of FIG. 42, showing holes 124. Numeral 125 points to the cavity within the cylinder for insertion of blades 127 and 128 of scissorlike part 140. FIG. 45 is a side view of scissorlike part 140. FIG. 44 is its front view. Note that the bottom half of the holed parts of the handles are detachable, for easy removal of the attached cables. Parts 131 can be removed by loosening captive bolts 130. Blades 127 and 128 are pivoted at pin 129. As in scissorlike part, FIG. 2, a magnet may be placed between handles at 133, shown in dashed lines, or in cavity or recess between blades at 132 to keep blades 127 and 128 apart. Magnet placed at 132 would be rectangular-shaped.

In conclusion, it is claimed that the techniques described here achieve the objectives of reduced labor and time in performing the unloading operation. The operation may be performed more safely at reduced manpower costs because of the automatic features in the techniques described. The simplicity of the coupling devices enable missions to be performed which otherwise would not be done because of safety hazards and possible loss of life, particularly in ship off-shore unloading operations.

I claim:

1. A structural device for quickly releasing and unloading suspended cargo, comprising an independent upper part A, an independent lower part B and a magnetic member C, and with hoist cables attached to parts A and B:

wherein said upper part A, being a block with a frustum of a right circular cone-shaped cavity at one end and having a hole through said block at the end opposite to said cavity, said cavity having its narrow portion below its wider portion, said hole for hoist cable attachment and said cavity for part B attachment;

wherein said lower part B comprising a scissorlike device having a hole in each of two handles at said handle's lower ends and having a pair of dulled blades at its upper portion and pivoted with a single pivot pin at said part's midsection and crisscrossed; with said handles and said blades held apart by a properly shaped permanent magnet with rounded side edges, said member C, inserted between the interior surfaces of said handles to prevent the closing together of said blades and the consequent separation of part A from part B under suspended load conditions; said holed handles being for hoist cable attachment to said cargo, and said blades for insertion into said cavity of part A.

2. A structural device in accordance with claim 1, wherein said block, part A includes recesses within said cavity at diametrically opposite ends for firmly holding said Part B in place and also preventing any rotational movement of said blades of Part B within Part A.

3. A structural device in accordance with claim 1, wherein said Part A is the lower part and said Part B is the upper part and said magnet member C, includes a hole for cord attachment, enabling removal of said magnet by personnel remotely located from said cargo.

4. A device in accordance with claim 1, wherein said holes, one at the opposite end of each of said blades, being pivoted to two additional pivoted members with the four pivoted members forming a parallelogram; and at the pivoted point of said additional pivoted members the provision of a sufficiently large hole at center of said pivoted point to enable a hoist cable to be fastened thereto; and wherein said pivoted members are capable of free movement when said magnet is dislodged from its position between said handles.

5. A device in accordance with claim 4, wherein said magnetic member C includes sides which are straight and parallel and wherein said member includes a hole at its center for a rod to be inserted and fastened to said member at said rod's midsection to enable said member to be removed from its location by pulling on cords, one attached to each end of said rod until said magnet makes contact with inner exterior of said pivoted point, so that said scissorlike Part B can be detached from Part A when said cargo makes contact with a loading platform surface and tensions on said hoist cables are relieved.

6. A device in accordance with claim 2, wherein said blades and said central hole are rectangular-shaped, enabling snug engagement between said parts A and B and preventing any rotational movement between said scissorlike part and said toroidal member.

7. A mechanical cargo detachment device for unloading a suspended load, held by hoist cables from a helicopter, derrick or crane, comprising an upper Part A and a lower Part B attached to said load by load cables:

wherein said upper Part A, attached to a hoist cable, being shaped like a doughnut with a central hole and with two or more eyelets equally spaced and mounted on its exterior surface for hoist cable suspension and with said central hole sufficiently large to accommodate said lower Part B, comprising a scissorlike device with holed handles, extending downward and a pair of dulled blades at its upper portion and pivoted with a single pivot pin at said Part B's midsection and criss-crossed; with said blades and said handles held apart by said load cables downwardly divergent from said handles, so that the horizontal components of tension in said cables tend to spread apart said scissorlike device, thereby preventing said blades from slipping through said hole in said part A; said Part B rests snugly inside said Part A's interior hole; said holes through said handles enabling said load cables, supporting said cargo, to be firmly fastened to each of said holes, and other hoist cables from above said device to be fastened to said eyelets of said Part A, so that as long as said device supports said load, said handles and said blades are kept apart by the weight of said load; said lower Part B automatically separating from said upper Part A when said load makes contact with a loading platform surface and tension on said hoist cables is relieved.

8. A device in accordance with claim 7, wherein said central hole in said part A has a flared outwardly portion toward at least one of its surfaces to match the angle which the open blades of said part B make when suspending said load, whereby said blades of said part B will snugly engage said flared outwardly portion of said central hole, in order to achieve a more positive engagement, since more surface area of said part A would be making contact with part B.

9. A device in accordance with claim 7, wherein said central interior hole has four or more sides to accommodate said midsection of said Part B firmly.

10. A device in accordance with claim 7, wherein said central interior hole has indentations to firmly accommodate said midsection of said Part B, to prevent its rotational movement as well as any vertical motion, implied in claim 6.

11. A device in accordance with claim 7, wherein said Part A is the lower part and said Part B is the upper part, and a properly shaped magnet is placed between the interior surfaces of said handles of said scissorlike device to prevent the collapse of said device under load conditions and the separation of Part A from Part B, said handles of said part B having recesses to receive the rounded side edges of said magnet.

12. A structural device for quickly releasing and unloading suspended load, comprising an independent lower part A and an independent upper part B and a locking member C:

wherein said part A is a toroidal member, with two or more eyelets rigidly attached at equally-spaced points around the periphery thereof, said eyelets being adapted for attachment to an equal number of cables, the other ends of which are attached to appropriately spaced points around the periphery of a cargo load suspended from said toroidal member, a scissorlike part with a single pivot pin projecting through the central hole in said toroidal member, with each half of said scissorlike part comprising a blade and a holed handle about said pivot pin, so that said part, comprises two blades criss-crossing and two handles with holes, said locking member C, comprising removable means, holding and clamping said scissorlike part in open position, with said blades projecting through said central hole, locking said scissorlike part and said toroidal member together in coupling engagement; each of said blades having a protrusion at its top inner side to prevent said locking member C from being ejected from its location; a cable extending from an overhead crane or helicopter connected to both holes of said scissorlike part; removal of said member C, when said load reaches a loading platform and cable tension is released, enabling said parts A and B to be decoupled.

13. A structural device in accordance with claim 12, wherein said locking member C, comprises a trapezoidal-shaped part having within it at least one solenoid with a plunger which pulls in when electrically excited; said plunger extending into a properly-sized hole in the inside surface of one of said handles, said plunger operating from a switch at said locking member C location and at switch from an overhead hoist reeling mechanism.

14. A structural device in accordance with claim 12, wherein said locking member C, comprises a trapezoidal-shaped part having within it at least one rotary-type solenoid, which rotates a plunger to an open position when activated electrically and retracts away from an appropriately sized recess in the exterior inside surface of one of said handles, said plunger capable of being operated from a switch at location of said locking member C and at a switch located at an overhead hoist reeling mechanism.

15. A structural device in accordance with claim 12, wherein said locking member C comprises a trapezoidal-shaped part having within it at least one solenoid with a plunger which pulls in when electrically excited, said plunger normally extending into a properly-sized hole in the inside surface of one of said handles when not excited, and a second solenoid with a plunger which pushes out when electrically excited against the under central portion of said scissorlike part, said plunger normally retracting into the cylinder of said second solenoid when not excited, both said plungers capable of operating almost simultaneously either from a 3-way switch at said locking member C location or from a 3-way switch at an overhead hoist reeling mechanism.

16. A coupling device comprising a lifting block with a hole therethrough and with means for attaching hoist cables, a scissorlike part having blades arranged to be inserted in said hole and provided with means for attaching load cables, a load adapted to be suspended from the two handles of said scissorlike part in such a way that the weight of said load will tend to spread apart said scissorlike part so that said blades will engage the sides of said hole so that said lifting block and said scissorlike part are held together in engagement and whereby when said load is placed on a loading platform allowing the weight of said load on said scissorlike part to be released, said lifting block and said scissorlike part will automatically separate.

* * * * *